United States Patent
Veenstra et al.

(10) Patent No.: US 8,601,141 B2
(45) Date of Patent: Dec. 3, 2013

(54) PROVIDING ENTERPRISE SERVICES IN A SERVICE PROVISIONING NETWORK

(75) Inventors: Pieter Koert Veenstra, The Hague (NL); Pieter Anne Span, Amsterdam (NL); Leendert Huibert Brouwer, Moerkapelle (NL)

(73) Assignee: Koninklijke KPN N.V., The Hague (NL)

( * ) Notice: Subject to any disclaimer, the term of this patent is extended or adjusted under 35 U.S.C. 154(b) by 136 days.

(21) Appl. No.: 12/884,905

(22) Filed: Sep. 17, 2010

(65) Prior Publication Data
US 2011/0072141 A1 Mar. 24, 2011

(30) Foreign Application Priority Data

Sep. 18, 2009 (EP) .................................. 09011907
Nov. 9, 2009 (EP) .................................. 09014016

(51) Int. Cl.
*G06F 15/16* (2006.01)
(52) U.S. Cl.
USPC ........... 709/228; 709/229; 709/223; 709/224; 709/202
(58) Field of Classification Search
USPC ............................ 709/228, 229, 223, 224, 202
See application file for complete search history.

(56) References Cited

U.S. PATENT DOCUMENTS

| | | | |
|---|---|---|---|
| 8,108,930 B2 * | 1/2012 | Hoefelmeyer et al. | 726/23 |
| 2003/0004744 A1 * | 1/2003 | Greene et al. | 705/1 |
| 2004/0008837 A1 * | 1/2004 | Sylvain | 379/265.09 |
| 2006/0046728 A1 * | 3/2006 | Jung et al. | 455/445 |
| 2007/0189152 A1 * | 8/2007 | Tamura et al. | 370/216 |
| 2008/0219268 A1 * | 9/2008 | Dennison | 370/395.2 |
| 2011/0066707 A1 * | 3/2011 | Brunson et al. | 709/221 |
| 2011/0164563 A1 * | 7/2011 | Naqvi et al. | 370/328 |
| 2012/0244861 A1 * | 9/2012 | Agarwal et al. | 455/435.1 |

FOREIGN PATENT DOCUMENTS

WO WO2007/103121 9/2007

OTHER PUBLICATIONS

European Search Report, European Patent Application No. 09014016.1, dated Mar. 26, 2010.
European Search Report, European Patent Application No. 09011907.4, dated Jun. 16, 2010.
Gurbani, V. et al., "Representing Trunk Groups in Tel/Sip Uniform Resource Identifiers (URIs)"; RFC 4904, IETF Standard Internet Engineering Task Force, IETF, Jun. 2007, pp. 1-19.
Alcatel-Lucent, "SIP: The Future of Open Communications", Technology White Paper, Jun. 12, 2008, URL:http:// enterprise.alcatel-lucent.com/private/active_docs/SIP_TechWhitePaper_EN.pdf, pp. 1-15.

* cited by examiner

*Primary Examiner* — Lan-Dai T Truong
(74) *Attorney, Agent, or Firm* — McDonnell Boehnen Hulbert & Berghoff LLP (57) ABSTRACT

A method and a system for providing enterprise services in a service provisioning network is described wherein service provisioning network is connected through at least one trunk to at least one enterprise network. The method comprises the steps of: providing a service request associated with an enterprise network; associating trunk information to said service request; routing said service request to an application server comprising one or more enterprise services associated with said enterprise network; and, said application server executing at least one enterprise service using said trunk information.

24 Claims, 7 Drawing Sheets

PROVIDING ENTERPRISE SERVICES IN A SERVICE PROVISIONING NETWORK

CROSS-REFERENCE TO RELATED APPLICATIONS

The present application claims priority to European Patent Applications EP 09011907.4 filed on Sep. 18, 2009 and EP 09014016.1 filed on Nov. 9, 2009, the entire contents of both of which are incorporated herein by reference.

FIELD OF THE INVENTION

The present disclosure relates to providing enterprise services in a service provisioning network, and, in particular, though not necessarily, to a method and a system for providing enterprise services in a service provisioning network, a subscriber server and a border control network node for use in such system and a computer product program using such method.

BACKGROUND

Currently many network operators are migrating to so called Next Generation Networks (NGN), typically IP-based communications systems, such as the IP Multimedia Subsystem (IMS) as developed by the Third Generation Partnership Project (3GPP). IMS is designed to provide IP Multimedia over mobile communication networks (3GPP TS 22.228, TS 23.218, TS 23.228, TS 24.228, TS 24.229, TS 29.228, TS 29.229, TS 29.328 and TS 29.329). For fixed broadband services, such as Voice over IP (VoIP), the ETSI TISPAN working group is further developing IMS (TS 24.229: IP Multimedia Call Control Protocol based on SIP and SDP). Within the IMS architecture, the basic user subscription functions and the IP session management are decoupled from the specific VoIP service functions, e.g. number analysis, CLIP/R, Call Waiting, Call Barring, Call Waiting, etc. These services are handled within one or more trusted application servers residing in the network.

Not only network operators but also private organizations, e.g. enterprises, start migrating to IP-based communication systems. However, even the TISPAN architecture has yet to satisfy all the requirements associated with delivering services to enterprises. In such an IP-based enterprise network, usually referred to as a Next Generation Corporate Network (NGCN), typically one or more IP private branch exchanges (IP-PBX) manage the connections among the enterprise communications devices (e.g. wireline phone, wireless phone, soft client) and the interoperability to circuit or packet switched network. The NGCN may be connected to the PSTN or an IP-based network through a trunk line, a single logical connection between the two networks.

When connecting an NGCN comprising one or more IPPBXs to an IMS platform, the trunk is an IP interface between the IP-PBX and the edge of the IMS platform, typically a session border controller (SBC). The services offered by the IP-PBX may be hosted locally. Currently however there is a trend to migrate these services to the network. In the context of IMS, services associated with each IP-PBX such as terminating and/or originating call services and business trunk services are hosted on one or more application servers connected to the IMS core.

ETSI TS 182 proposes two business trunking schemes. A first scheme relates to a subscription-based business trunking scheme, wherein an NGCN applies registration of the NGCN site to the NGN and the entry point of the NGCN site into the NGN is the P-CSCF. The registration of a single NGCN site identifier results in the implicit registration of a set of NGCN user identifiers. In this scheme an IMS Application Server (AS) may provide business trunking services.

The subscription-based business trunking scheme however has a number of disadvantages. One problem relates to the fact that it requires the NGCN to support IMS-style registration procedures (including the associated authentication procedures). Many existing NGCNs however do not support IMS-style registration procedures thereby seriously limiting the applicability of such scheme.

IMS-style registration may be realized by a "surrogate registration" using for example one or more Session Border Controllers (SBCs) between the non-IMS NGCN site and the IMS network. The SBC or—in more complex cases—multiple SBCs may take care of the registration procedure on behalf of the NGCN. The SBC(s) should therefore be provisioned with customer data (such as enterprise identities and enterprise credentials for allowing registration of individual users to the network). Further, customer data would also be present in an IMS Application Server (AS), thus resulting in a situation where customer data are distributed over multiple entities.

Such a situation is highly undesirable as this would severely complicate maintenance of the provisioned data and customer control of the enterprise data.

A further consequence of the registration procedure is that each NGCN user identity is uniquely associated to a single NGCN site. This precludes the possibility of having various redundancy, load sharing, and overflow solutions where NGCN sites may share NGCN user identities and where NGCN sites are connected via different routes (e.g. using different trunks) to the NGN.

In order to provide services to individual users in an NGCN, individual registrations of the IP-PBXs and (via implicit registrations) of the NGCN users to the IMS platform are required. This requires all individual user profiles of each IP-PBX connected to the IMS core to be stored in the UPSF/HSS. Hence, any change in the configuration of NGCN users (e.g. a move of an employee to a different location) over the various NGCN sites would require a change in the implicit registration sets in the UPSF/HSS combined with general re-registrations by all NGCN sites involved. Further, a NGCN may contain multiple IP-PBXs, which may share one or more number ranges.

A second business trunking scheme suggested in TS 182 relates to a peering-based business trunking scheme wherein it is assumed that an NGCN acts as a peer network to the NGN. Such a scheme implies that the NGN is not capable of providing advanced services, including services similar to the ones provided by an IP-PBX, to the NGCN on the basis of an application server.

In this scheme, the NGN only provides routing functionality determined by entities such as a domain name server. Moreover, due to the peering network concept there is no concept of the NGN providing originating and terminating services via application servers to the NGCN as in the subscription-based business trunking scheme. Any complex services such as number/identity consolidation (e.g. converting national number format into international number format, etc.), calling identity validation, selective blocking of destinations, call diversion, complex redundancy, load sharing, and overflow solutions involving shared number ranges are not foreseen in such architecture.

Hence, there is a need in the art for improved methods, systems, and network elements which may provide efficient and centralized control over advanced services, including IP-based communication services, associated with NGCN networks.

SUMMARY

It is an object of the disclosure to reduce or eliminate at least one of the drawbacks of known service provisioning systems. In a first aspect the disclosure may relate to a method for providing enterprise services in a service provisioning network, wherein the method may comprise the steps of: interconnecting an enterprise network to said service provisioning network using an interconnect border control network node associated with said service provisioning network; providing a service request associated with an enterprise network; and, an application server associated with said service provisioning network executing at least one enterprise service on the basis of said service request.

The method may also relate to a method of providing enterprise services in a service provisioning network, preferably an IMS-based service provisioning network, wherein said service provisioning network is connected through at least one trunk, preferably via an interconnect border control network node associated with said provisioning network, to at least one enterprise network. The method may comprise the steps of: providing a service request associated with an enterprise network; associating an enterprise identifier and trunk information to said service request; routing said service request to an application server comprising one or more enterprise services associated with said enterprise network; and, said application server executing at least one enterprise service using said enterprise identifier and said trunk information.

Connecting the enterprise network via an interconnect border control network node, does not require registration of the enterprise network to the NGN. Hence in contrast to known business trunking schemes it does not require IMS-style registration (including the corresponding authentication and security association procedures) and allows the NGN to provide advanced originating and terminating services e.g. via a standard IMS Application Server. Furthermore, it allows concentration of all enterprise data (such as enterprise user data and enterprise routing data) centrally on a trusted application, thereby allowing simple updates (either by the NGN provider or by the enterprise itself) over the lifetime of the service for the enterprise.

In one embodiment said service request is an originating service request, preferably an originating call service request, and/or wherein said service provisioning network acts as an originating service provisioning network.

In a further embodiment the method may further comprise the steps of: sending said originating service request to an interconnect border control network node associated with said service provisioning network; said interconnect border control network node associating said request with an enterprise identifier and trunk information; generating an originating enterprise service request by inserting said enterprise identifier and said trunk information in the header of said originating service request.

In a variant the P-Asserted Identity header comprising said enterprise identifier is inserted in said header of said originating service request.

In yet another embodiment the method may further comprise the step of: assigning said originating enterprise service request to a serving network node associated with said originating enterprise network.

In one embodiment said method may further comprise the steps of: providing said serving network node with an enterprise profile, preferably said enterprise profile being provided by a subscriber server associated with said service provisioning network; executing said enterprise profile, preferably on the basis of the filter criteria in said enterprise profile, wherein said enterprise profile being configured to route said enterprise request to an application server comprising one or more enterprise originating services associated with said originating enterprise network.

In another embodiment said application server may execute at least one originating service on the basis of said enterprise identifier and said trunk information.

In yet a further embodiment said service request may be a terminating service request, preferably a terminating call service request, and/or said service provisioning network is a terminating service provisioning network.

In one variant the method may further comprise the steps of: sending said terminating service request to said application server; said application server associating said terminating request with an enterprise identifier and trunk information; generating a terminating enterprise service request by inserting said enterprise identifier and said trunk information in the header of said terminating service request.

In another embodiment said method further may comprise the step of: assigning said terminating service request to a serving network node associated with an enterprise network, preferably said assignment of said serving network node being based on location information stored in a subscriber server of a home network associated with said terminating service request.

In yet another embodiment, the method further may comprise the steps of: providing said serving network node with an enterprise profile, preferably said enterprise profile being provided by said subscriber server associated with said home network; executing said enterprise profile, preferably on the basis of the filter criteria in said enterprise profile, wherein said enterprise profile being configured to route said terminating request to an application server comprising one or more terminating enterprise services associated with said terminating enterprise network.

In a further embodiment, the method may comprise the steps of: routing said terminating enterprise service request to an interconnect border control network node connecting said service provisioning network with said enterprise network; said interconnect border control network node selecting on the basis of the enterprise identifier and the trunk information in said terminating enterprise service request an enterprise network controller, preferably a private branch exchange, for providing terminating services to a terminating node within the enterprise network identified in the terminating enterprise service request.

In other variants, said enterprise services may comprise at least one terminating and/or originating call services and/or trunk services.

In a further variant said trunk may provide a connection between an interconnect border control network node associated with said service provisioning network and an enterprise network controller, preferably a private branch exchange, for providing services associated with terminating and/or originating nodes within said enterprise network.

In one embodiment said enterprise identifier may comprise the global directory number (GDN) of the enterprise network controller associated with said enterprise network.

In another embodiment said service request may be routed on the basis of an enterprise profile stored on a subscriber server, said enterprise profile being associated with one or more wildcard user ID ranges allowing the service provisioning network to provide services to a specific user ID within one of said user ID ranges.

In another aspect the disclosure may relate to a system for providing enterprise services, wherein said system may comprise: a service provisioning network, at least one enterprise network; an interconnect border control network node associated with said service provisioning network for connecting said enterprise network to said service provisioning network; and, an application server associated with said service provisioning network for executing at least one enterprise service on the basis of a service request associated with said enterprise network. The disclosure may also relate to a system for providing originating enterprise services, wherein said system may comprise: a service provisioning network, preferably an IMS based service provisioning network, at least one enterprise network connected to said service provisioning network connected through at least one trunk; a border control network node associated with said service provisioning network and connected to said trunk, said interconnect border control network node being configured to assign an enterprise identifier and trunk information to a service request originating from said enterprise network; a subscriber server comprising one or more enterprise profiles; a serving network node configured to route said originating service request on the basis of an enterprise profile to one or more application servers comprising at least one or more originating enterprise services associated with said enterprise network.

In yet another aspect the disclosure may relate to a system for providing terminating enterprise services, wherein said system may comprise: a service provisioning network, preferably an IMS-based service provisioning network, at least one enterprise network connected to said service provisioning network connected through at least one trunk; a subscriber server comprising one or more enterprise profiles; a serving network node configured to route on the basis of an enterprise profile a terminating service request associated with an enterprise network to one or more application servers comprising at least one or more terminating enterprise services associated with said enterprise network; an application server being configured to assign an enterprise identifier and trunk information to a terminating service request received from said serving network node.

In yet a further aspect the disclosure may relate to a subscriber server for use in systems as described above, wherein said subscriber server may comprise one or more stored enterprise profiles, said one or more enterprise profiles comprising identification information of an enterprise network controller, preferably a private branch exchange, associated with an enterprise network and one or more wildcard user ID ranges allowing the service provisioning network to provide services to a specific user ID within one of said user ID ranges.

In one aspect the disclosure may relate to an interconnect border control network node for use in systems as described above wherein said interconnect border control network node may be configured for connecting through at least one trunk to an enterprise network controller, preferably a private branch exchange, associated with an enterprise network and said interconnect border control network node being configured to generate an originating enterprise service request by inserting an enterprise identifier and trunk information in the header of said originating service request, preferably said enterprise identifier and trunk information is inserted in said header using a P-Asserted Identity header.

In another aspect the disclosure may relate to an interconnect border control network node for use in systems as described above, wherein said interconnect border control network node may be configured for connecting through a trunk to an enterprise network controller, preferably a private branch exchange, associated with an enterprise network and said interconnect border control network node being configured to receive a terminating enterprise service request comprising an enterprise identifier and trunk information and said interconnect border control network node being configured to select on the basis of the enterprise identifier and the trunk information in said terminating enterprise service request an enterprise network controller, preferably a private branch exchange, for providing terminating services to a terminating node within the enterprise network identified in the terminating enterprise service request.

The disclosure may also relate to a computer program product providing enterprise services in a service provisioning network, said network preferably comprising an IP Multimedia Subsystem (IMS), the computer program product comprising software code portions configured for, when run on one or more network nodes in said service provisioning network, executing at least one of the method steps as described above. The disclosure will be further illustrated with reference to the attached drawings, which schematically show embodiments according to the disclosure. It will be understood that the invention is not in any way restricted to these specific embodiments.

DETAILED DESCRIPTION

Figure 1:
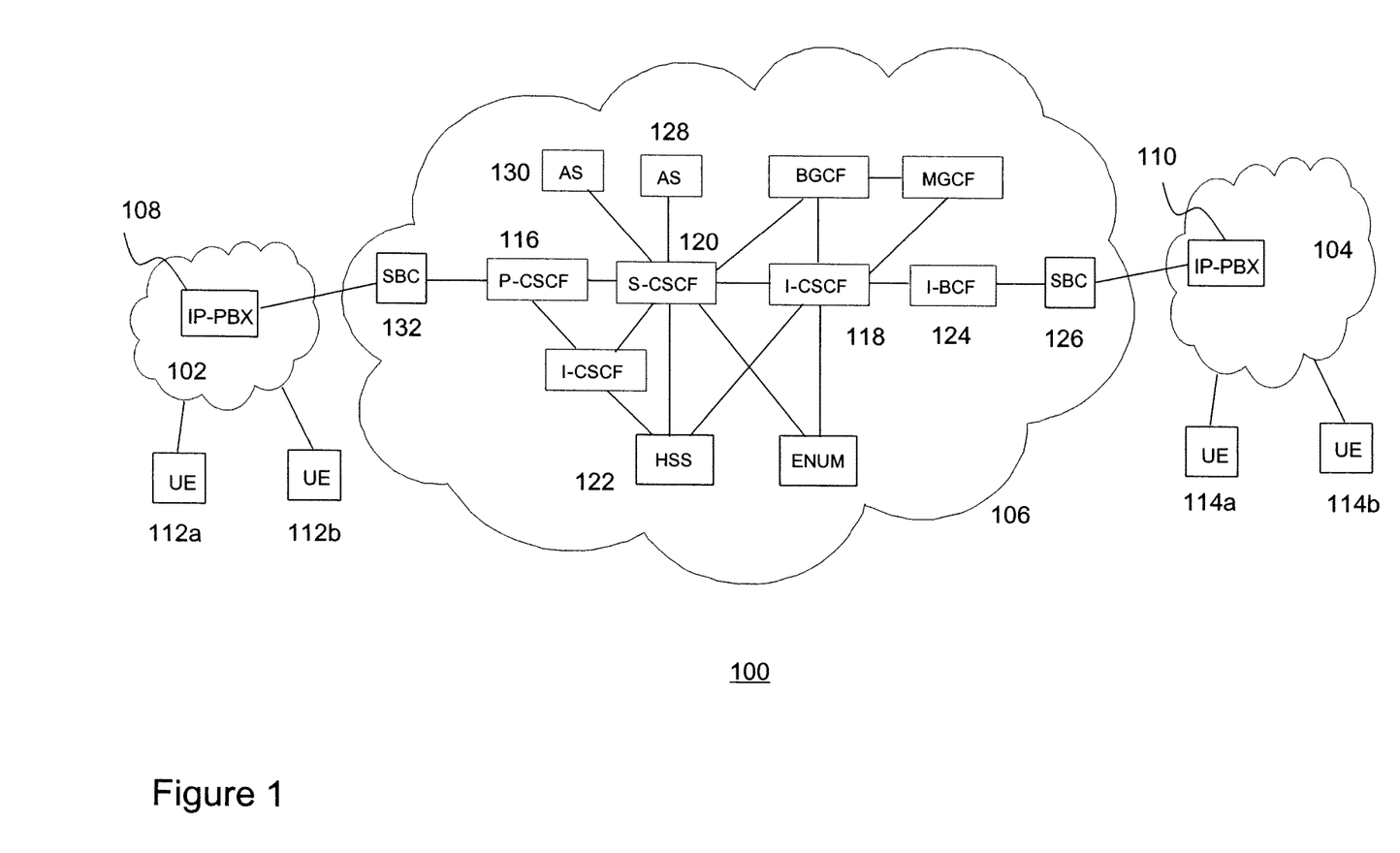
FIG. 1 depicts a schematic of a service provisioning system according to one embodiment of the disclosure.

FIG. 1 depicts a schematic of at least part of an NGN service provisioning system 100, in particular an IMS-based service provisioning system for providing service to one or more enterprise networks according to one embodiment of the disclosure.

The system comprises one or more NGCNs, i.e. IP-based enterprise networks 102, 104, connected to the IMS platform 106. IP-PBXes 108, 110 associated with these enterprise networks are responsible for controlling the end-points on the enterprise premises as well as the management of the required services. The end-points (i.e. terminals) 112a, 112b, 114a, 114b used in the enterprise network may comprise wireline and/or wireless phones, SIP phones, etc.

The IMS core typically comprises a set of Call/Session Control Functions (CSCF), including a Proxy-CSCF (P-CSCF) 116, an Interrogating-CSCF (I-CSCF) 118 and a Serving-CSCF (S-CSCF) 120. Normally, the P-CSCF is the first contact within the IMS core and, using routing information during the registration to the IMS system, it routes signaling messages (e.g. SIP INVITE) to the S-CSCF associated with a user. The I-CSCF is located at the edge of a domain and identifies the correct S-CSCF for each incoming SIP request and forwards the request to that S-CSCF. Its IP address is published in the DNS of the domain so that remote servers can find it. Further, the S-CSCF performs the session control services and acts as a SIP registrar.

Registration with the IMS involves the transfer of the service profile associated with the subscriber to the IMS, which is stored in the Home Subscriber Service (HSS) database 122 (sometimes also referred to as the User Profile Server Function (UPSF)) to the S-CSCF over Cx in a standardized XML format. These service profiles comprise routing information for routing signaling messages that are either originated from or addressed to a particular terminal or one or more trusted application servers.

The application servers (AS) 128, 130 may comprise services e.g. voice-centric (VoIP) and/or multimedia services.

The VoIP application server may provide a minimum set of features to support the call routing to and from the NGCN, regulatory, and billing requirements. Further, at least one application server may comprise trunking services such as overflow behavior services, wherein certain trunk sets are grouped in an ordered list to handle traffic in a specified manner and/or to handle load behavior services wherein a list of trunks that are part of the same trunk set will be used in a specified manner to handle the traffic.

If the NGCN relies on a subscription-based business trunking scheme, registration of an IP-PBX to the IMS may involve an SBC 132 registering on behalf of the NGCN both the IP-PBX 108 and all individual terminals associated with the IP-PBX 108 via the P-CSCF 116 to the IMS core. Such registration process may involve the transmission of a registration signaling message, e.g. a SIP REGISTRATION message, via the SBC 132 and the P-CSCF 116 to the I-CSCF 118 of the IMS core. The I-CSCF 118 selects on the basis of the information provided by the HSS 122 a suitable S-CSCF 120.

The registration message may then be forwarded to the S-CSCF 120 serving a UE for authenticating the user. After successful authentication and registration, the HSS 122 may provide the S-CSCF 120 with service routing information which may be contained in or associated with the service profile. On the basis of the service routing information, the S-CSCF 120 may register the IP-PBX 108 with one or more services in the one or more application servers by sending a register message (such as a SIP REGISTER message) to the application servers identified in the service routing information. The services may be identified by a set of initial filter criteria (iFC) in or associated with the user service profile.

An iFC may be generally regarded as service routing rules comprising a filter part and a decision part, wherein the filter part comprises so-called Trigger Points, defining one or more filter criteria which are applied to the incoming service message. The decision part specifies the action(s) to be taken when the incoming message matches with the filter criteria of the rule. The iFC thus comprises information for determining whether or not a SIP message should be routed to a service located in a particular application server.

The iFCs are defined in the standard in paragraph B.2.2 of document TS 129 228, which is hereby incorporated by reference in this application. An iFC may comprise one or more Trigger Points, i.e. Boolean flags determined by a set of conditions to be met by the SIP request, and one or more SIP URIs of application servers the SIP request should be routed to in case the Trigger Point is TRUE. In case the Trigger Point is FALSE, it will not be routed to the application server comprising the service identified in the iFC.

In the system of FIG. 1 however NGCNs are not necessarily connected to the IMS platform based on the subscription-based business trunking scheme. In contrast with conventional schemes, the system in FIG. 1 also provides for one or more NGCN IP-PBXs 112, 114 which do not register with the IMS core but instead are directly connected via at least one trunk to the Interconnection Border Control Function (IBCF) 124, also referred to as interconnect border control network node, which may be co-located with the SBC 126, which normally handles border control for the SIP signaling interface, topology hiding and interworking with non-IMS networks.

A trunk provides an IP interface between an enterprise network and an Interconnect Border Control Function (IBCF) 124, the edge of the IMS platform and comprises an IP address and port number in the IMS core and an IP address and port number at the enterprise (virtual) IP-PBX. A trunk is assigned to a trunk set, which is a collection of trunks an NGCN can use for traffic to and from certain number ranges (i.e. a consecutive range of phone numbers that can be used on a trunk set by a company as source/destination for SIP Sessions).

In the embodiment as depicted in FIG. 1, the I-BCF may 124 be implemented in a session border controller (SBC) 126.

Alternatively, in another embodiment, the I-BCF 124 may be implemented in the IMS session layer. In order to establish the connection with the I-BCF 124 the IMS is either configured with the static IP address of the IP-PBX, or it is configured with the domain name of the customer network which it then uses to obtain the IP address of the IP-PBX via DNS.

Direct interconnection between the NGCN and the NGN through the I-BCF provides the advantage that the IP-PBX and individual users associated with the NGCN are not required to register with the IMS core. Hence problems with regard to "surrogate registration" by the SBC may be avoided and allowing the NGN to provide the NGCN with services, including trunking services, via an application server. The advantages of using such registration-free business trunking scheme will become apparent with reference to FIGS. 2-7 as described below.

Figure 2:
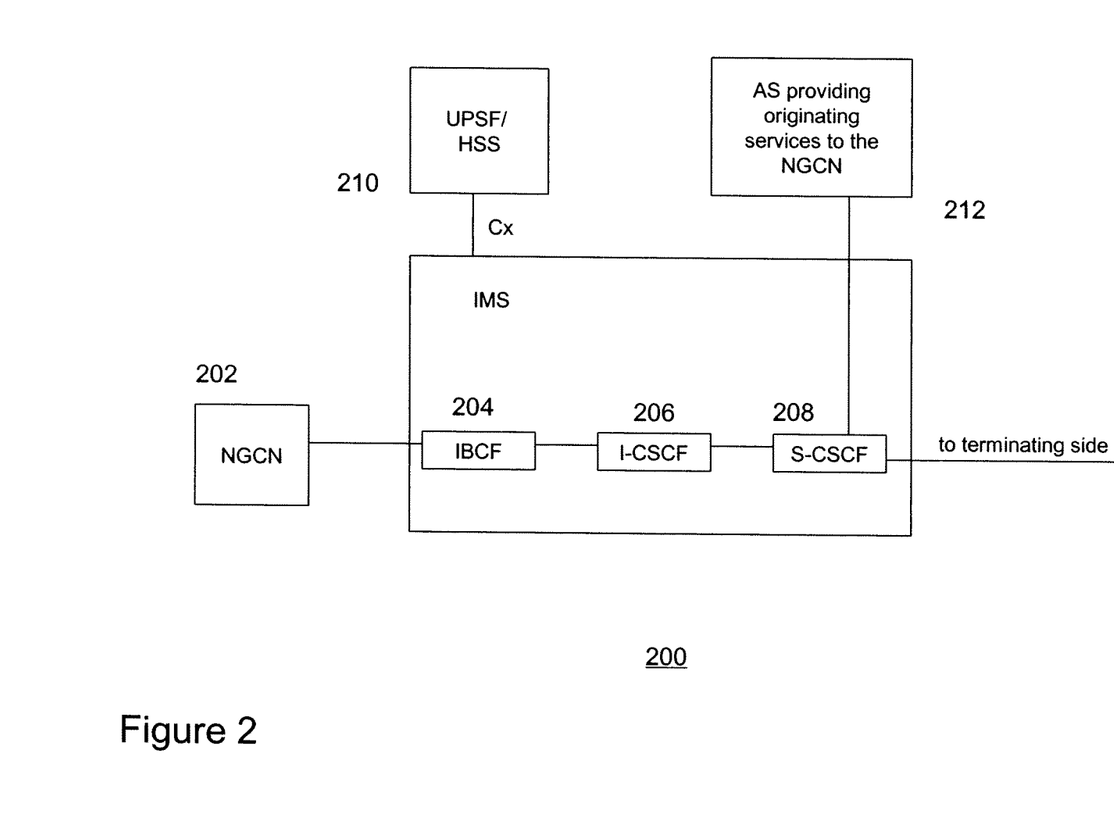
FIG. 2 depicts a schematic of a system for providing originating services to an NGCN according to one embodiment of the disclosure.

FIG. 2 depicts a schematic of a system 200 for providing originating services to an NGCN according to one embodiment of the disclosure. In this configuration, the NGCN 202 is interconnected via the I-BCF 204 and the I-CSCF 206 to the S-CSCF 208 of the IMS platform. Hence, the entry point for the NGCN into the NGN is the I-BCF function (and not the P-CSCF function). Further, neither the NGCN nor its end-users are explicitly or implicitly registered with the IMS core.

Instead, the HSS 210 of the IMS-platform comprises an unregistered entry in the HSS for originating use. Through the unregistered originating entry in the HSS (UPSF) the NGN is able to provide originating business trunking services via an IMS Application Server 212 for calls leaving the NGCN and entering the NGN.

Figure 3:
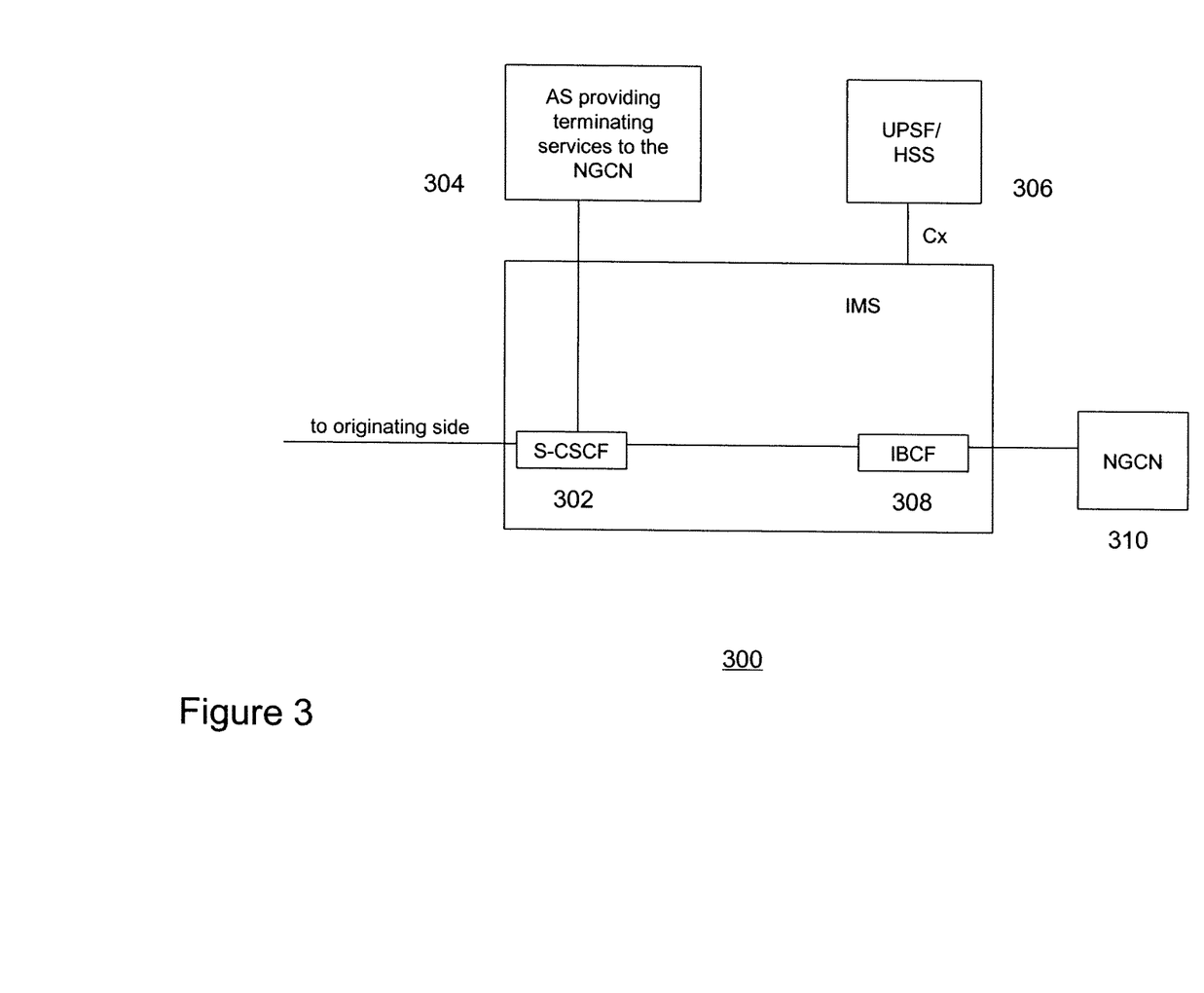
FIG. 3 depicts a schematic of a system for providing terminating services to an NGCN according to one embodiment of the disclosure.

Similarly, FIG. 3 depicts a schematic of a system 300 for providing terminating services to an NGCN according to one embodiment of the disclosure. Also in this case the exit point for the NGN into the NGCN 310 is the IBCF function 308 (and not the P-CSCF function). Further, neither the NGCN nor its end-users are explicitly or implicitly registered with the IMS core. Through the unregistered terminating entry in the HSS (UPSF) the NGN is able to provide terminating business trunking services via an IMS Application Server 304 for calls leaving the NGN and entering the NGCN. The registration-free business trunking scheme as described with reference to FIGS. 2 and 3 provides the advantage that in contrast to known business trunking schemes it does not require IMS style registration (including the corresponding authentication and security association procedures) and allows the NGN to provide advanced originating and terminating services e.g. via a standard IMS Application Server. Furthermore it concentrates all enterprise data (such as enterprise user data and enterprise routing data) centrally on a trusted application, thereby allowing simple and secure updates (either by the NGN provider or by the enterprise itself) over the lifetime of the service for the enterprise.

Figure 4:
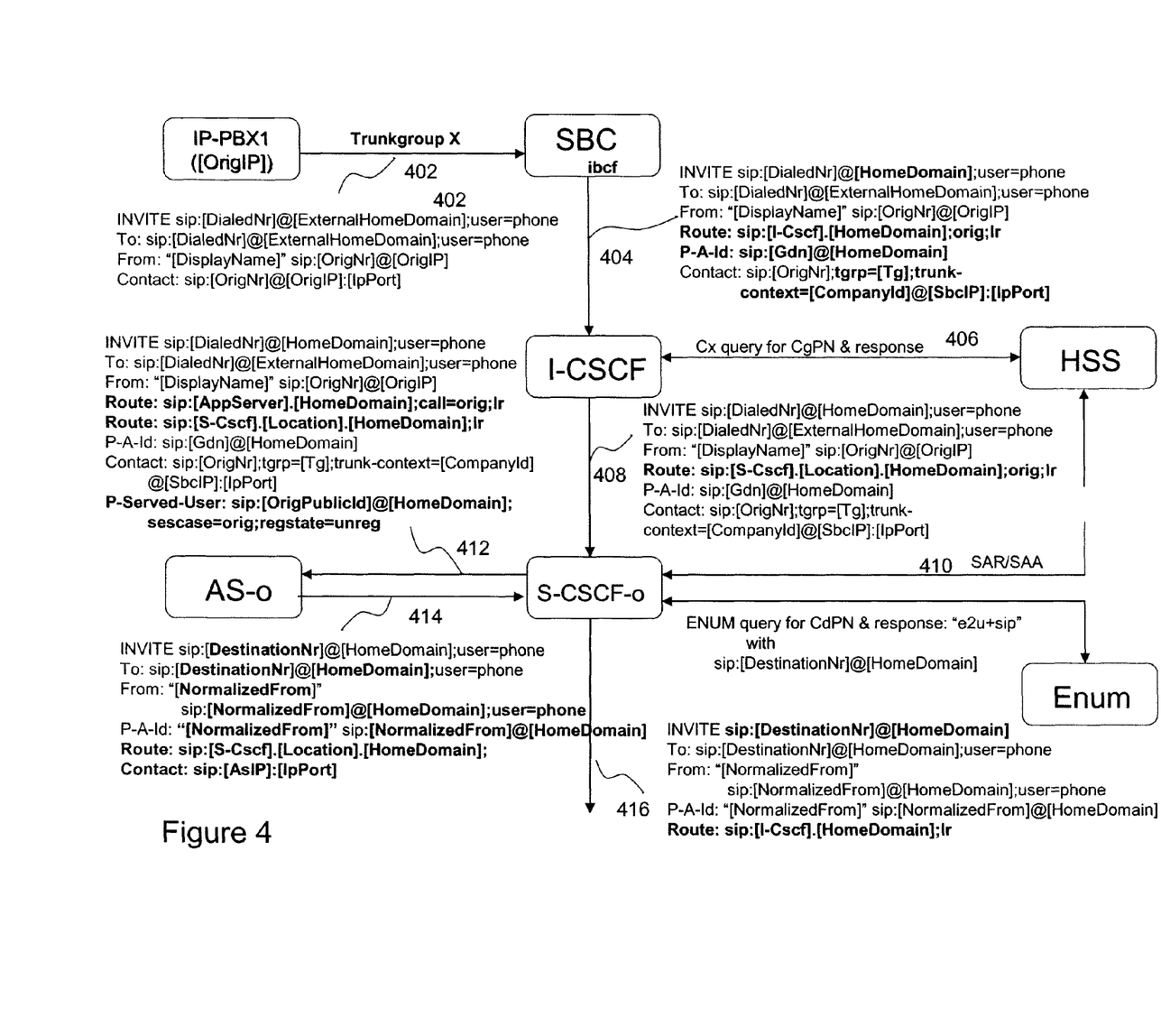
FIG. 4 depicts an originating call flow according to one embodiment of the disclosure.

FIG. 4 depicts a call originating in a NGCN IP-PBX towards the NGN. The SIP signaling must be routed to the application server (AS) assigned to provide originating services to the NGCN (the enterprise network). The originating signaling path in this case may be IP-PBX->SBC->I-CSCF->S-CSCF->AS. The IP-PBX may be provisioned with the SBC host name, or IP address, and may send the call attempt to that address.

The SBC may be provisioned with the IP address of the IP-PBX and based on this address the SBC recognizes both the incoming trunk set and the customer, e.g. a user within the enterprise network. This information may be used in order to populate the SIP P-Asserted-Identity with the GDN, i.e. the Global Directory Number of the IP-PBX associated with the enterprise network. The SBC may subsequently send the request to a provisioned I-CSCF.

The I-CSCF may perform regular IMS originating handling and use the P-Asserted-Identity to find the S-CSCF. The S-CSCF also relies on the P-Asserted-Identity to find the AS. Further, the AS may use the P-Asserted-Identity to find a further proprietary server network that contains the customer-specific settings.

The IP-PBX may originate a call with the IMS platform. In that case the IP-PBX may provide the requested destination and, optionally, the direct dial-out (DDO) number that originates the call. In the non-registering mode the originating (DDO) number, and the PBX itself, are not registered with the IMS Core. Instead, IMS services are provided to the PBX DDO numbers with unregistered originating service profiles provisioned in the HSS. Originating trunking services may be provided by AS comprising trunking services.

The originating call flow in FIG. 4 starts with an IP-PBX (part of the enterprise network) sending an INVITE (originating service request) to the IMS platform (part of the service provisioning network) (step 402). The INVITE complies with the basic SIP RFCs for an originating INVITE. The IMS platform entry point is the I-BCF/SBC. The I-BCF/SBC adapts the INVITE and performs the following modification on the INVITE (the modified and/or added fields are depicted in bold): modification of the INVITE to handle the IP-PBX specific SIP dialect to the IMS form; modification of the SIP URI domain names for the IMS external domain [ExternalHomeDomain] to the IMS internal domain [HomeDomain]; addition of the P-Asserted-Identity with the Global Directory Number (GDN) of the enterprise (i.e. the generic default number of the enterprise, which is an enterprise identifier); addition of a route header that points to the I-CSCF and includes an "orig" parameter; and addition of a contact header comprising contact information (trunk information) for contacting the originating IP-PBX including the address and the port associated with the IP-PBX in the "trunk-context" parameter and the trunk group in the "tgrp" parameter.

Hence, the parameters 'trgpf (trunk group) and 'trunk-contextf are used in order to identity the appropriate trunk between the IP-PBX and the SBC. In particular the parameter 'trgp' may identify a VLAN associated with an IP address on the SBC (see also FIG. 7) and the "trunk-context" parameter (e.g. a domain name or an enterprise identifier) may identify the enterprise using the trunk connection identified by 'trgpf. This way enterprise trunk connections may be uniquely identified using these parameters. Other parameters in the header such as SbcIP and IpPort identify the IP address and the IP port of the SBC respectively.

Further, the P-Asserted-Identity (representing the NGCN) created by the SBC is subsequently used by the S-CSCF to locate the appropriate Initial Filter Criteria. The P-Asserted-Identity uses the Global Directory Number (GDN) of the enterprise as user part.

Thereafter, the SBC sends the adapted INVITE (generated originating enterprise service request) to the I-CSCF (step 404). Based on the "orig" parameter in the route header and the Global Directory Number of the IP-PBX (GDN) in the P-Asserted-Identity header, the I-CSCF queries the HSS to assign a S-CSCF (serving network node) assigned to the IP-PBX (step 406). The HSS returns the S-CSCF assigned to handle the IP-PBX. The I-CSCF then forwards the request for originating processing to this S-CSCF (step 408). The I-CSCF and the S-CSCF may treat the INVITE messages as originating messages due to the use of the 'orig' parameter in the Route headers.

If not yet done, the S-CSCF retrieves the subscriber profile from the HSS (step 410) and executes the filter criteria for the unregistered origination SIP request associated with the IP-PBX resulting in the request to be sent to the AS. Upon reception of the originating INVITE (step 412), the AS may perform certain actions. For example, it may:

perform call admission control and deny the origination in case one of the call admission control limits is exceeded;

perform A-number validation and normalize the A-number;

perform originating features associated with the originating user and the originating user enterprise;

replace the P-Asserted-Identity header with the validated and normalized A-number;

populate the "From" header with the validated and normalized A-number; in case the From: number does not match within the range for this enterprise, then the enterprise global do will be used in the From: header.

normalize the destination number in the Request URI and the "To" header;

return the INVITE to the originating S-CSCF for further routing of the request.

A-number validation includes the steps of matching the calling party number taken from the "From" header against the number ranges assigned to the trunks associated with the IP-PBX. These number ranges are stored in the HSS in the user profile associated with the HSS. If the number matches the lookup, the calling party is considered to be validated. In case the "From" number does not match within the number range associated with the IP-PBX, then the Global Directory Number (GDN) will be used in the From: header. Also note that DisplayName gets overwritten here by the Display name defined in the AS.

In particular, the Application Server may be used to perform various normalization of numbers. For example, it may convert [DialedNr] (e.g. a number in national format) into [DestinationNr] (an international format starting with +), and it may convert [OrigNr] (e.g. in national format) into [NormalizedFrom] (an in international format starting with +).

Thereafter, the session request is sent to the S-CSCF and continues as standard originating session request (steps 414 and 416) to the destination. The S-CSCF (orig) may query ENUM for the called party number. The call is then routed according to the information returned by ENUM.

Figure 5:
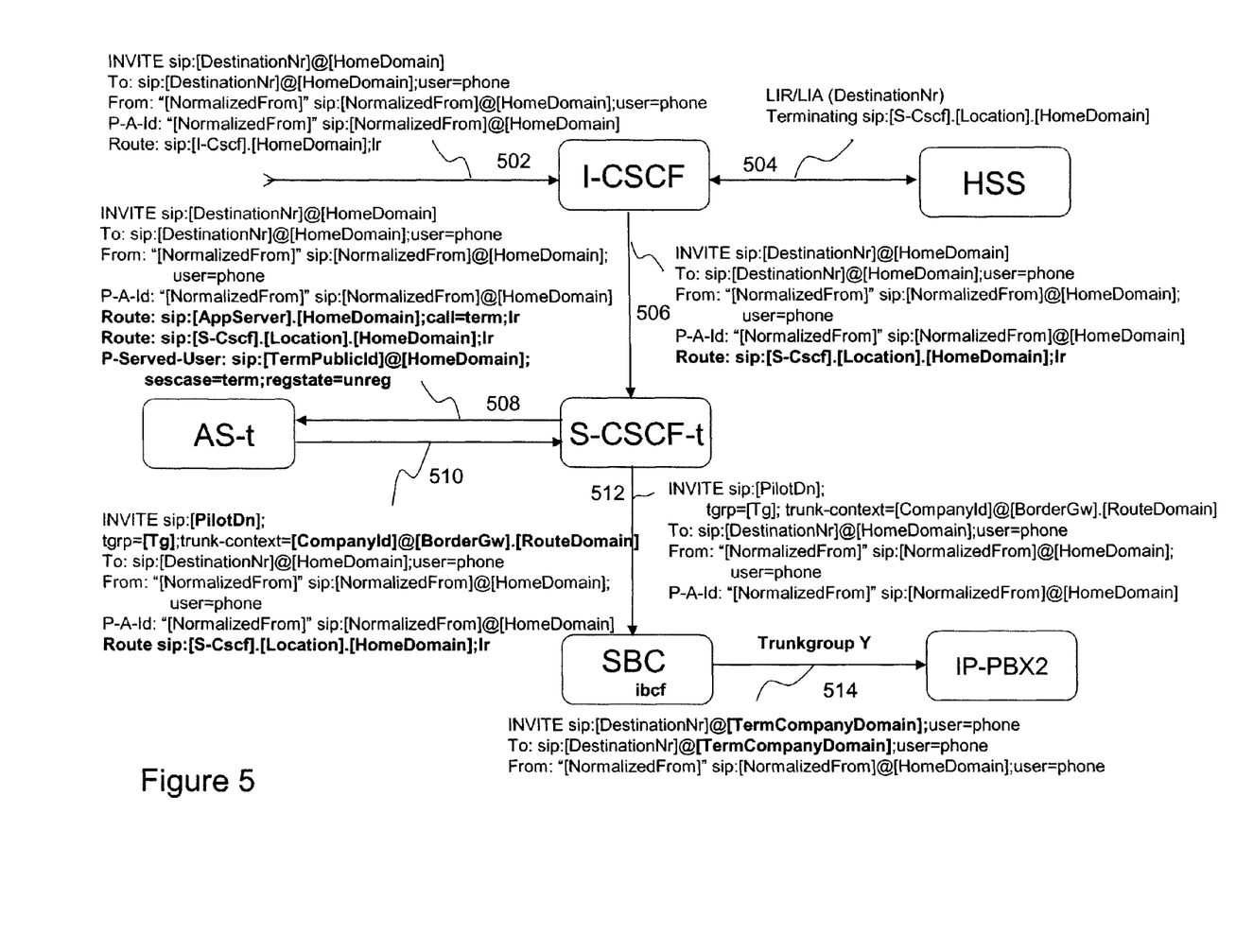
FIG. 5 depicts a terminating call flow according to one embodiment of the disclosure.

FIG. 5 depicts a terminating call flow according to one embodiment of the disclosure. The terminating call flow shows the flow of the SIP messages for a terminating PBX call.

The signaling for a call to an IP-PBX is routed via the AS through the IMS core to the IP-PBX. The signaling route is: ICSCF->S-CSCF->AS->S-CSCF->SBC->IP-PBX.

Within this scheme, the PBX Direct-Dial-In (DDI) numbers, i.e. the numbers associated with the users in the NGCN and the PBX itself are not registered with the IMS core.

Routing to the DDI number is based on static data and the IMS services are provided to the PBX numbers with unregistered terminating service profiles in the HSS. An AS is used for terminating services, including the terminating trunk services that result in the selection of trunk connection to the IP-PBX.

For terminating routing the I-CSCF may perform an HSS lookup with the called party number, which returns the assigned S-CSCF. Further, the S-CSCF may use the called party number to retrieve the service profile which contains the filter criteria that result in involving the AS. The AS uses the called party number to determine to which NGCN the user belongs and then performs the business trunking features.

Thereafter, the AS may return the request with the selected outgoing trunkgroup identifier (trkgID) in the request URI to the S-CSCF. The trkgID domain name may be an external domain name and on that basis the S-CSCF may perform a lookup on this external domain name and send the request to the host found.

This host may be an I-BCF/SBC which determines the address of the enterprise IP-PBX based on the trkgID and the "tgrp" parameter in the Request URI and sends the INVITE to that address.

The terminating call flow in FIG. 5 comprises the following steps. After the originating AS completes the originating services, the request may be returned to the originating S-CSCF for destination routing. Then, the originating S-CSCF queries ENUM, wherein the result indicates the destination number is part of the IMS. Then, the S-CSCF sends the request to an I-CSCF (step 502 in FIG. 5).

The I-CSCF subsequently queries the HSS with the called party number from the Request-URI to locate the terminating S-CSCF (step 504) and sends the INVITE to the terminating S-CSCF (step 506).

The terminating S-CSCF downloads the HSS service profile if not already done and evaluates the filter criteria for unregistered terminating service. The terminating S-CSCF sends the request to the AS for terminating services (step 508). Then, upon reception of the INVITE, the terminating AS may:
  provide terminating user services such as call diversion;
  perform terminating trunk services, such as load balancing, overflow and backup, which results in the selection of the outgoing trunk;
  populate the ongoing INVITE message with 'trgp' and 'trunk-context' parameters in order to describe the routing to the appropriate SBC and the appropriate trunk between the SBC and the NGCN IP-PBX;
  place the normalized destination (DDI) number in the "To" header; and/or,
  send the INVITE to the S-CSCF as a new terminating Out of the blue (OOTB) session request. This request does not contain the odi generated by the S-CSCF.

The terminating Application Server may apply the Pilot Directory Number [PilotDn] (i.e. the generic default number of the specific IP-PBX) and the Border Gateway [BorderGW] and routing domain [RouteDomain] in order to route the session to the appropriate SBC. Further, the INVITE message coming from the Application Server to the S-CSCF is considered to be a new session, so that it may be routed to an I-BCF instead of to a P-CSCF. This is achieved by omitting any original dialog identifiers in this INVITE message.

After the execution of the terminating services, the modified request messages is sent to the S-CSCF (step 510). Upon reception of the INVITE with an external domain name, the S-CSCF may perform a lookup of the next-hop network element that connects to the external domain name and sends the request thereto. The next-hop may be resolved by an S-CSCF based table lookup or, alternatively, by DNS query. The resulting hostname is an SBC used for VoIP Connection. In a further embodiment, the built-in IBCF could be returned, and the IBCF determines the SBC to use.

The S-CSCF may then send the INVITE to the SBC (step 512), which may select the IP-PBX based on the request URI domain name and "tgrp" parameter. In particular, the SBC may convert the internal domain [HomeDomain] into the external domain [TermCompanyDomain]. The value of [TermCompanyDomain] is derived from [CompanyId]. The SBC may perform the SIP header manipulation specific for the PBX type SIP flavor and forwards the request to the IP-PBX (step 514). Upon reception of the INVITE the IP-PBX provides terminating services to the called user.

In the flows described with reference to FIGS. 4 and 5, the trunking services in the AS may use the trunk URI parameters specified in RFC 4904 to identify the incoming trunk from the IP-PBX and the outgoing trunk towards the IP-PBX.

Figure 6:
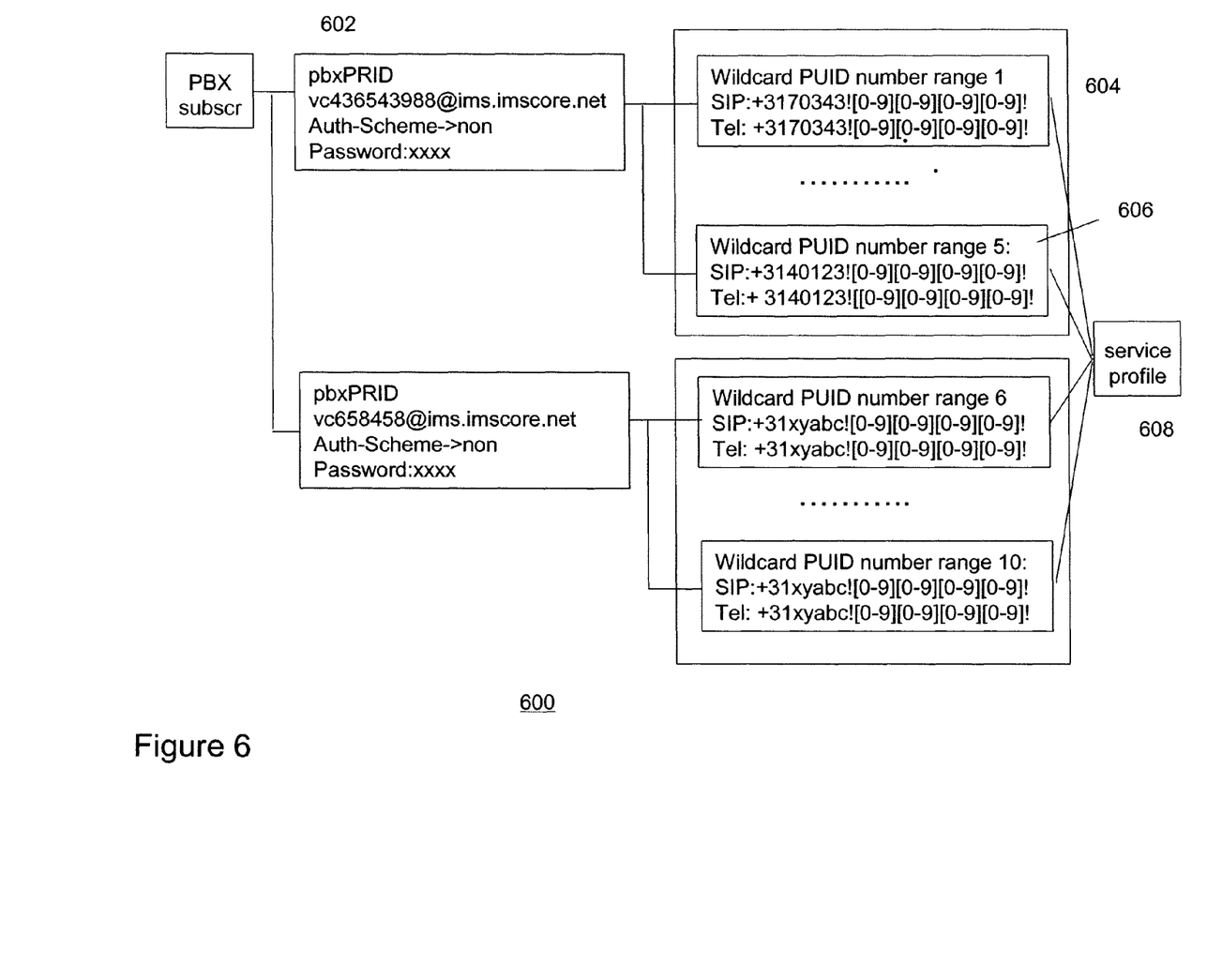
FIG. 6 depicts a schematic of a data model of a subscriber server according to one embodiment of the disclosure.

The RFC defines two parameters, the "tgrp" parameter and the trunk-context parameter. FIG. 6 illustrates a schematic layout 600 of the HSS data model according to one embodiment of the disclosure. The HSS may contain private identity 602 of the enterprise. This private identity may be associated with an implicit registration set containing a wildcard SIP and TEL entry for a customer number range 604, 606. The registration set is linked with a service profile 608 of subscribers to the IMS.

Hence, the HSS may support a wild card mechanism that may be used to represent a number range in the HSS. For example, a single registration set in the HSS may contain up to 10 entries. Each number or number range must be defined as a tel and as a sip uri and thus requires 2 entries. This implies that one registration set in the HSS can hold up to 5 numbers/ number ranges. In case an enterprise requires more then 5 number ranges the HSS may have to be provisioned with multiple HSS entries, all leading to the same service profile.

The one or more wildcard user ID ranges allow the IMS to provide services to one or more specific user IDS within one or more of said user ID ranges.

Figure 7:
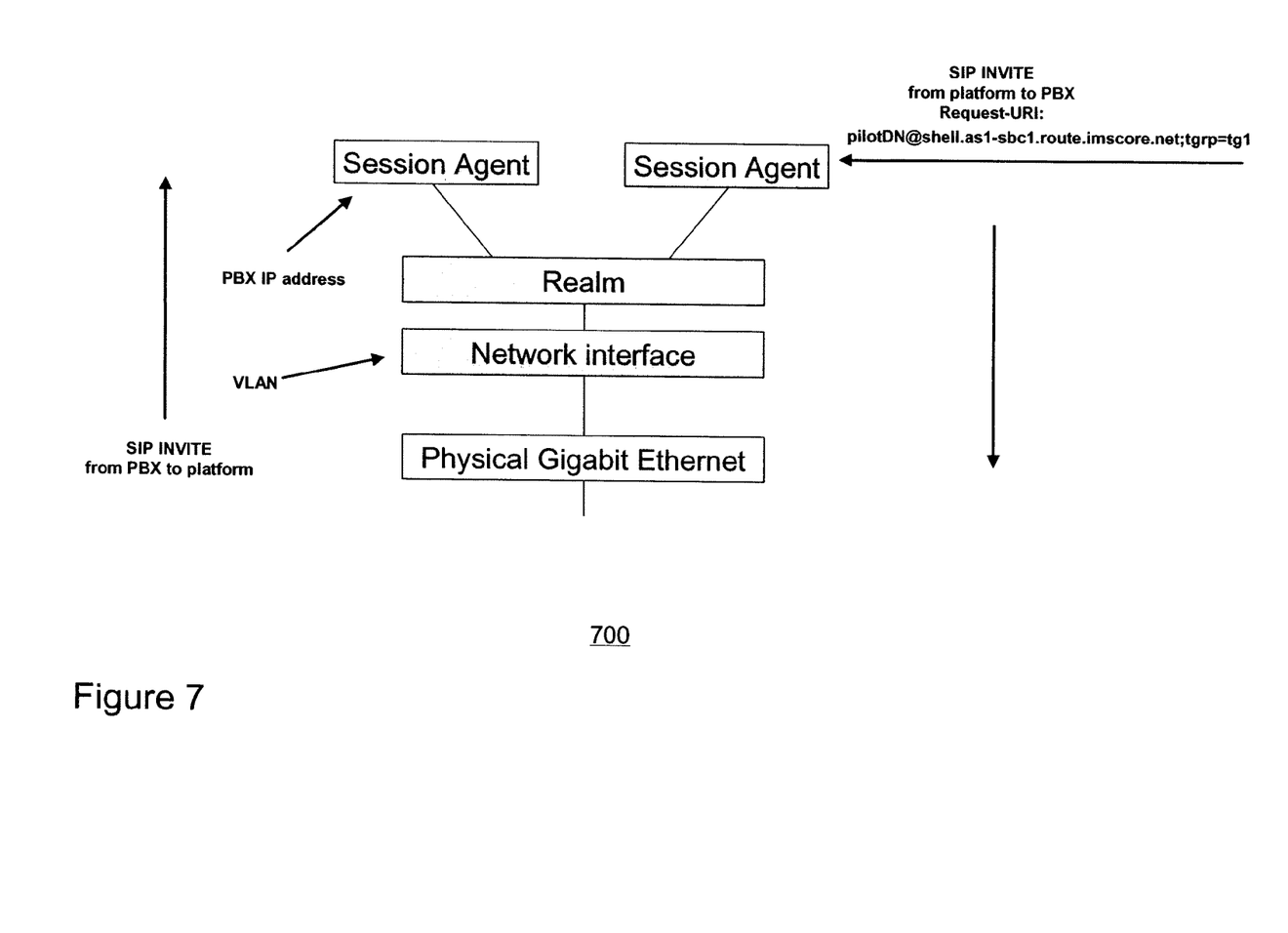
FIG. 7 depicts a schematic of a Session Border Controller according to one embodiment of the disclosure.

FIG. 7 depicts a high-level schematic of the SBC, which is used for connecting enterprise networks to the IMS platform. In addition, the SBC may perform SIP manipulation specific for the PBX type. The SBC concept of realm represents the customer associated with the services, while the SBC Session Agent is the representation of the IP-PBX.

For a new call from the IP-PBX to the IMS platforms, the realm may be determined by the VLAN on which the message was received in the SBC. Within the VLAN the IP address of the IP-PBX may be used to identify the session agent.

For a call from the VoIP Connect platform to an IP-PBX the SBC realm may be determined by the top-most element of the Request URI domain name, while the session agent may be determined based on the "tgrp" parameter of the Request URI.

The "tgrp" parameter uniquely identifies the IP-PBX within the realm. The PBX type specific SIP manipulation is associated with the Session Agent.

It is to be understood that any feature described in relation to any one embodiment may be used alone, or in combination with other features described, and may also be used in combination with one or more features of any other of the embodiments, or any combination of any other of the embodiments. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Further, the disclosure is not limited to IMS but may also be implemented in a 3GPP Long Term Evolution (LTE) or 3GPP Service Architecture Evolution (SAE) networks. Further, although the embodiments are described with reference to the SIP (Session Initiation Protocol) signaling protocol, other signaling protocols like H.323, H.248 and the MGCP (Media Gateway Control Protocol) may also be used. Moreover, the disclosure is not limited to the embodiments described above, which may be varied within the scope of the accompanying claims.

The invention claimed is:

1. A method for providing enterprise services in an Internet Protocol (IP) Multimedia Subsystems (IMS) based service provisioning network, the method comprising:
    receiving a message being an originating service request from a terminal endpoint device associated with an enterprise network via an interconnect border control network node, the interconnect border control network node functioning to provide service requests associated with the enterprise network with a direct entry point of the IMS based service provisioning network, thereby avoiding using a Proxy Call/Session Control Function (P-CSCF) as an entry point of the IMS based service provisioning network, and the originating service request being a request that originates in the enterprise network for a Session Initiation Protocol (SIP) based session service;
    adding, by the interconnect border control network node, information to the originating service request;
    based on the information added to the originating service request by the interconnect border control network node, determining a serving network node to assign to the originating service request, wherein the added information includes a route header that points to an Interrogating Call/Session Control Function (I-CSCF) of the IMS based service provisioning network, and wherein the serving network node is a Serving Call/Session Control Function of the IMS based service provisioning network,
    wherein the originating service request is routed on the basis of a profile stored on a subscriber server, the profile associating users with services of the IMS based service provisioning network;
    forwarding the originating service request to the assigned serving network node; and
    by forwarding the originating service request from the assigned serving network node to an application server associated with the IMS based service provisioning network, causing the application server to execute at least one originating service on the basis of the originating service request.

2. The method according to claim 1, wherein the route header includes an "orig" parameter.

3. The method according to claim 2, wherein determining the serving network node to assign to the originating service request comprises treating the originating service request as an originating message responsive to the inclusion of the "orig" parameter in the route header.

4. The method according to claim 1, wherein the IMS based service provisioning network is interconnected through at least one trunk to the enterprise network, and wherein the method further comprises:
    associating trunk information with the originating service request;
    routing the originating service request to an application server comprising one or more enterprise services associated with the enterprise network; and
    the application server executing at least one enterprise service using the trunk information.

5. The method according to claim 4, wherein the application server executes at least one originating service on the basis of the trunk information.

6. The method according to claim 4, wherein the trunk information comprises an enterprise identifier comprising a global domain number (GDN) of an enterprise network controller associated with the enterprise network.

7. The method according to claim 1, further comprising:
    sending the originating service request to the interconnect border control network node associated with the IMS based service provisioning network;
    the interconnect border control network node associating the request with trunk information; and
    generating an originating enterprise service request by inserting the trunk information in a header of the originating service request.

8. The method according to claim 7, wherein a P-Asserted Identity header comprising an enterprise identifier is inserted in the header of the originating service request.

9. The method according to claim 1, further comprising:
    a subscriber server associated with the IMS based service provisioning network providing the serving network node with an enterprise profile, the enterprise profile being configured to route the originating service request to an application server comprising one or more enterprise originating services associated with the enterprise network; and
    executing the enterprise profile on the basis of filter criteria in the enterprise profile.

10. The method according to claim 1, wherein the enterprise services comprise at least one particular service selected from the group consisting of an originating call service and a trunk service.

11. The method according to claim 1, wherein a trunk provides a connection between the interconnect border control network node associated with the IMS based service provisioning network and an enterprise network controller for providing services associated with terminating and/or originating nodes within the enterprise network.

12. The method according to claim 1, wherein the originating service request is routed on the basis of an enterprise profile stored on a subscriber server, the enterprise profile being associated with one or more wildcard user ID ranges allowing the IMS based service provisioning network to provide services to a specific user ID within one of the user ID ranges.

13. The method according to claim 1, wherein the enterprise network and terminals connected to the enterprise network are not registered with the IMS based service provisioning network.

14. The method according to claim 1, wherein the IMS based service provisioning network comprises a subscriber server, the subscriber server comprising an enterprise profile, the profile allowing registration-free service provisioning in response to service requests associated with the enterprise network.

15. A system for providing enterprise services, the system comprising:
an Internet Protocol (IP) Multimedia Subsystems (IMS) based service provisioning network acting as an originating service provisioning network;
at least one enterprise network;
an interrogating network node associated with the IMS based service provisioning network;
a serving network node;
an interconnect border control network node associated with the IMS based service provisioning network for connecting the enterprise network to the IMS based service provisioning network, wherein the interconnect border control network node is configured to provide a direct entry point of the IMS based service provisioning network for service requests associated with the enterprise network, thereby avoiding using a Proxy Call/Session Control Function (P-CSCF) as an entry point of the IMS based service provisioning network;
an application server associated with the IMS based service provisioning network; and
machine-language instructions stored in memory and accessible by one or more processors that when executed by the one or more processors cause the system to carry out functions including:
receiving by the interconnect border control network node an originating service request from a terminal endpoint device associated with the at least one enterprise network, the originating service request being a request that originates in the enterprise network for a Session Initiation Protocol (SIP) based session service,
adding, by the interconnect border control network node, information to the originating service request,
based on the information added to the originating service request by the interconnect border control network node, determining a serving network node to assign to the originating service request, wherein the added information includes a route header that points to an Interrogating Call/Session Control Function (I-CSCF) of the IMS based service provisioning network, and wherein the serving network node is a Serving Call/Session Control Function of the IMS based service provisioning network,
wherein the originating service request is routed on the basis of a profile stored on a subscriber server, the profile associating users with services of the IMS based service provisioning network,
forwarding the originating service request to the assigned serving network node, and
by forwarding the originating service request from the assigned serving network node to the application server,
causing the application server to execute at least one service on the basis of the originating service request.

16. The system according to claim 15, wherein the interconnect border control network node is configured to add the route header to the originating service request that points to the interrogating network node and to add an "orig" parameter to the originating service request route header.

17. The system according to claim 16,
wherein determining the serving network node to assign to the originating service request comprises treating the originating service request as an originating message due to inclusion of the "orig" parameter in the route header.

18. The system according to claim 15, wherein the at least one enterprise network is connected through a trunk to the interconnect border control network node, and wherein the interconnect border control network node is configured to assign trunk information to a service request originating from the enterprise network, the trunk information comprising at least one of an enterprise identifier and a trunk identifier.

19. The system according to claim 15, further comprising:
a subscriber server comprising an enterprise profile, the profile allowing registration-free service provisioning in response to at least one of an originating or terminating service request associated with the enterprise network; and
a serving network node configured to route the service request on the basis of the enterprise profile to one or more application servers comprising at least one or more enterprise services associated with the enterprise network.

20. An interconnect border control network node, configured for being coupled to an enterprise network and an Internet Protocol (IP) Multimedia Subsystems (IMS) based service provisioning network for interconnecting the enterprise network with the IMS based service provisioning network through at least one trunk to an enterprise network controller associated with the enterprise network, the interconnect border control node being further configured to provide a direct entry point of the IMS based service provisioning network for service requests associated with the enterprise network, thereby avoiding using a Proxy Call/Session Control Function (P-CSCF) as an entry point of the IMS based service provisioning network, and the interconnect border control node comprising:
at least one processor;
memory accessible by the at least one processor; and
machine-language instructions stored in the memory that when executed by the at least one processor cause the interconnect border control node to carry out functions including:
receiving a message that is an originating service request from a terminal endpoint device associated with the enterprise network via an enterprise network controller, the originating service request being a request that originates in the enterprise network for a Session Initiation Protocol (SIP) based session service,
associating the originating service request with trunk information,
adding information to the originating service request, and
forwarding the originating service request to the IMS based service provisioning network,
wherein the IMS based service provisioning network includes an assignable serving network node, configured to receive the originating service request and to forward the originating service request to an application server associated with the IMS based service provisioning network, thereby causing the application server to execute at least one originating service on the basis of the originating service request, wherein the information added to the originating service request is used for determining a serving network node to assign to the originating service request, wherein the added information includes a route header that points to an Interrogating Call/Session Control Function (I-CSCF) of the IMS based service provisioning network, and wherein the serving network node is a Serving Call/Session Control Function of the IMS based service provisioning network, and wherein the originating service request is routed on the basis of a profile stored on a subscriber server, the profile associating users with services of the IMS based service provisioning network.

21. The interconnect border control network node according to claim 20, wherein the interconnect border control network node is further configured to insert the trunk information in a header of the originating service request.

22. The interconnect border control network node according to claim 20, wherein the interconnect border control network node is an apparatus comprising an Interconnection Border Control Function (IBCF).

23. A non-transitory computer-readable medium having stored thereon a computer program product for providing enterprise services in an Internet Protocol (IP) Multimedia Subsystems (IMS) based service provisioning network, the computer program product comprising software code portions configured to, when run on one or more network nodes in the IMS based service provisioning network, execute a set of functions, the set comprising:

receiving a message that is an originating service request from a terminal endpoint device associated with an enterprise network via an interconnect border control network node, wherein the interconnect border control network node is configured to provide a direct entry point of the IMS based service provisioning network for service requests associated with the enterprise network, thereby avoiding using a Proxy Call/Session Control Function (P-CSCF) as an entry point of the IMS based service provisioning network, and wherein the originating service request is a request that originates in the enterprise network for a Session Initiation Protocol (SIP) based session service;

adding, by the interconnect border control network node, information to the originating service request;

based on the information added to the originating service request by the interconnect border control network node, determining a serving network node to assign to the originating service request, wherein the added information includes a route header that points to an Interrogating Call/Session Control Function (I-CSCF) of the IMS based service provisioning network, and wherein the serving network node is a Serving Call/Session Control Function of the IMS based service provisioning network, wherein the originating service request is routed on the basis of a profile stored on a subscriber server, the profile associating users with services of the IMS based service provisioning network;

forwarding the originating service request to the assigned serving network node; and by forwarding the originating service request from the assigned serving network node to an application server associated with the IMS based service provisioning network, causing the application server to execute at least one originating service on the basis of the originating service request.

24. The computer program product according to claim 23, wherein the route header includes an "orig" parameter.

* * * * *